(12) United States Patent
Kim

(10) Patent No.: US 7,387,266 B2
(45) Date of Patent: Jun. 17, 2008

(54) AGGREGATE RECYCLING APPARATUS HAVING AIR CIRCULATION TYPE FOREIGN SUBSTANCE AND FINE PARTICLE SEPARATION MEANS, AND METHOD THEREOF

(75) Inventor: Jang-Yong Kim, Gunpo-Si (KR)

(73) Assignee: Shintek Co., Ltd., Kyunggi-Do (KR)

( * ) Notice: Subject to any disclaimer, the term of this patent is extended or adjusted under 35 U.S.C. 154(b) by 162 days.

(21) Appl. No.: 11/429,980

(22) Filed: May 9, 2006

(65) Prior Publication Data
US 2006/0266857 A1  Nov. 30, 2006

(30) Foreign Application Priority Data
May 30, 2005  (KR) .................... 10-2005-0045652

(51) Int. Cl.
*B02C 23/14* (2006.01)
(52) U.S. Cl. ................. 241/60; 241/79.1; 241/DIG. 38
(58) Field of Classification Search ............... 241/60, 241/79.1, 19, DIG. 38
See application file for complete search history.

(56) References Cited
U.S. PATENT DOCUMENTS
4,813,618 A * 3/1989 Cullom .................. 241/79.1
5,184,780 A * 2/1993 Wiens ..................... 241/19
5,649,785 A * 7/1997 Djerf et al. ............. 405/129.27
5,699,969 A * 12/1997 Isaji ........................ 241/24.12
5,884,856 A * 3/1999 Isaji ........................ 241/76
5,992,774 A * 11/1999 Oh ........................... 241/20

* cited by examiner

Primary Examiner—Mark Rosenbaum
(74) Attorney, Agent, or Firm—Arent Fox LLP

(57) ABSTRACT

Disclosed is an aggregate recycling apparatus having an air circulation type foreign substance and fine particle separation means which directs a blast of air, circulated in a dry state, toward waste having passed through a crushing process immediately after the crushing of the waste and removes fine particles and foreign substances using a cyclone, thereby removing dust generated in the course of separating and screening the waste, and a method thereof. The aggregate recycling apparatus includes a crushing device for crushing waste, an air circulation type fine particle and foreign substance separation device for directing re-circulated air to crushed products received from the crushing device, scattering fine particles and foreign substances and collecting dust in a cyclone, an air conveyor for conveying crushed products deprived of the fine particles and foreign substances, and a double vibration screen for screening the crushed products received from the air conveyor.

6 Claims, 5 Drawing Sheets

AGGREGATE RECYCLING APPARATUS HAVING AIR CIRCULATION TYPE FOREIGN SUBSTANCE AND FINE PARTICLE SEPARATION MEANS, AND METHOD THEREOF

BACKGROUND OF THE INVENTION

1. Field of the Invention

The present invention relates to an aggregate recycling apparatus having an air circulation type foreign substance and fine particle separation means which separates foreign substances and fine particles immediately after crushing construction waste to decrease the amount of dust raised during the screening and separation of crushed products and to allow aggregate to be continuously recovered from construction waste, and a method thereof.

2. Description of the Prior Art

In the conventional art for recycling construction waste, an aggregate recycling apparatus comprises a primary crusher (a jaw crusher), a secondary crusher (a double jaw or cone crusher), a tertiary crusher (a cone or vertical impact crusher), a screen for screening crushed construction waste by size, a dry or wet type separation device for separating foreign substances from the crushed construction waste, a steel separator, and so forth. The gravel and sand obtained by processing the construction waste are washed with water to produce recycled gravel and sand.

However, serious ill effects result from noise and dust generated in the course of producing recycled aggregate. Also, in order to purify turbid water and use it as clean water, a turbid water treatment facility having a predetermined size is needed.

The turbid water treatment facility comprises various devices such as a filter press, a classifier, a rock washer, a water tank, various pumps, and so forth. In order to allow the purification of a large amount of turbid water using a water tank having a small size, a flocculant is required. This flocculant is a kind of chemical and essentially consists of an acid constituent. Therefore, when the flocculant is released in the form of being included in slurry and is buried so as to be mixed with the earth, it pollutes the earth. In this case, the degree of pollution may be more serious than the case in which construction waste is directly buried in the earth.

In order to produce gravel by recycling the construction waste through a series of processes, an initial investment of several billions is required, and a substantial maintenance and repair cost is also incurred.

Also, in the case of various dry type construction waste processing facilities, recycled gravel is produced by obtaining gravel through a crushing process, a screening process and a foreign substance separation process, which are similar to those adopted in the above-described facility, and then by removing fine particles using an air type (dry type) cyclone.

In this dry type method, a huge amount of dust is generated in the course of processing the construction waste (in several tens of processes).

If a water spraying device is installed to prevent dust from being raised, it is difficult to remove fine particles in the course of removing fine particles using the dry type cyclone.

SUMMARY OF THE INVENTION

Accordingly, the present invention has been made keeping in mind the above problems occurring in the prior art, and an object of the present invention is to provide an aggregate recycling apparatus having an air circulation type foreign substance and fine particle separation means which directs a blast of air circulated in a dry state toward waste that has passed through a crushing process immediately after the crushing of the waste and removes fine particles and foreign substances using a cyclone, thereby removing dust generated in the course of separating and screening the waste (including construction waste), and a method thereof.

In order to achieve the above object and solve the problems occurring in the conventional art, the present invention is characterized in that, in order to suppress the generation of dust (raised dust) in the course of separating and screening waste (including construction waste and gravel), the waste discharged through a crushing process by a crusher is introduced into an air circulation type foreign substance and fine particle separation device immediately after the crushing of the waste to remove foreign substance and fine particles, in that a chamber and a filter, for removing fine particles and purifying air, are provided in the middle of a blown air discharge path of the air circulation type foreign substance and fine particle separation device to remove fine particles not removed by a cyclone, and that a part of air is discharged after being purified to create constant negative pressure in an air conveyor so as to prevent the discharge of dust (raised dust) generated due to air blowing and to separate fine particles and foreign substances, thereby preventing the generation of dust in the course of performing blowing, screening, separating and discharging processes and continuously producing environment-friendly recycled gravel and sand having a desired quality at a reasonable cost.

A method for producing recycled gravel through processing of construction waste according to the present invention having the above-mentioned configuration will be described below.

First, as construction waste is put into a vibration hopper using heavy equipment such as an excavator, a wheel loader, and the like, earth is primarily removed by the vibration hopper, and then the construction waste is introduced into, crushed by, and discharged from a primary crusher such as an impact or jaw crusher. Next, metallic material such as steel, included in the crushed construction waste discharged from the primary crusher, is separated using a magnet, and the remaining crushed construction waste is discharged through a discharge conveyor. As the magnet, a magnet, which is conventionally used in the art and has been published in a patent or a utility model document, can be employed. It is sufficient to determine the installation position of the magnet so that metallic material such as steel, which is included in the conveyed construction waste, can stick to the magnet to be separated.

At this time, the construction waste dropping from the discharge conveyor receives an air blast circulated through a forced air flow passage by blast force of a blower and is scattered in an air conveyor box so that crushed products are scattered with various dropping velocities depending upon the specific gravity thereof.

The crushed products scattered in the air conveyor box are sucked into a cyclone by a pressure reduction mechanism of the blower, depending upon the specific gravity and a size thereof. In the cyclone, fine particles and foreign substances are separated and then discharged through a discharge conveyor which is positioned below the cyclone, and air is directed toward the blower to be used again.

In the above descriptions, the fine particles and foreign substances which are scattered and sucked into the cyclone have a size no greater than 0.3 mm.

Concretely speaking, the forced air flow passage is defined to communicate with the upstream end of a dropping path through which the crushed products drop from the discharge conveyor. Air blown through the forced air flow passage scatters the crushed products. Depending upon the specific gravity and size of the crushed products, fine particles and foreign substance are scattered into the air conveyor box, which is open at its entrance and exit and closed on its side walls and its upper wall. (When the upper part of the exit is closed, the operational efficiency is increased.) The fine particles and foreign substances are sucked through a forced air flow passage which is defined in an upper portion of the air conveyor box to communicate with the cyclone. At this time, as the blower directs air toward one end of the forced air flow passage, suction force is generated in that direction.

The crushed products which are not scattered, or are scattered and then dropped, are conveyed by an air conveyor which is installed on the lower part of the air conveyor box. The air conveyor is configured in the same manner as a conventional conveyor, and air flows through the lower part of the air conveyor box.

Fine particles, which are not removed by the cyclone and are still included in the air sucked into the blower, are removed by a chamber and a filter which are installed in the middle of the forced air flow passage. A predetermined amount of air, which is purified by having the fine particles removed therefrom, is discharged out of the device and maintains a negative pressure inside the air conveyor box. In this way, dust can be effectively separated, and air is repeatedly circulated.

Due to this air re-circulation procedure, since only the air purified while passing through the chamber and filter air are discharged outside, atmospheric pollution is avoided.

That is to say, as the chamber and the filter are installed between the blower and the forced air flow passage so that the fine particles not removed by the cyclone can be removed and the predetermined amount of air is purified to be discharged to the outside, negative pressure can be created inside the air conveyor box.

The filter may comprise a conventional filter which functions to remove the fine particles not separated in the cyclone, and the chamber designates a space which is defined in front of the filter.

(The reason why the chamber and the filter are employed in the procedure for re-circulating air, which is circulated through the forced air flow passage as described above and partially purifies the air to prevent atmospheric pollution and create negative pressure, is that, if the pressure of air supplied by forced blowing is too high, there is a likelihood of fine particles and foreign substances leaking outside while the device of the present invention operates, so it is necessary to reduce the pressure of air.?)

The crushed products, which drop while overcoming the suction force of the cyclone, are conveyed and discharged by an air conveyor which is installed on the lower part of the air conveyor box, and are then separated into three groups by a double vibration screen which is installed below the air conveyor. The crushed products having a small size of 0.3~8 mm are discharged onto a lower conveyor installed below the double vibration screen to be used as recycled sand, and the crushed products having a medium size of 8~25 mm are discharged onto another discharge conveyor installed to one side of the double vibration screen, to be used as recycled gravel. The crushed products having a large size of no less than 25 mm are put again into the impact crusher through a return conveyor installed at the other side of the double vibration screen to be crushed again, or are put into a secondary crusher, such as a cone crusher or a vertical type impact crusher, to undergo a crushing process to thereby continuously produce recycled gravel and sand.

In the above descriptions, due to the fact that the chamber and filter are installed in the middle of the forced air flow passage of the air circulation type fine particle and foreign substance separation device, fine particles and foreign substances which are not removed in the cyclone are separated, and only purified air is discharged, so that negative pressure is created in the air conveyor box to prevent dust (raised dust) generated by forced air circulation from leaking to the outside. Therefore, the crushed products discharged from the air conveyor are rid of fine particles and foreign substances so that dust is not raised in the course of screening the crushed products.

Moreover, a fan regulation plate is installed at the front end of the blower to decrease the air blast intensity and the amount of suction air. The fan regulation plate has the same configuration as that of the conventional art. The fan regulation plate has an opening and a closing element for closing the opening, so that the amount of air supplied from the fan of the blower can be adjusted. That is to say, the fan regulation plate has a configuration which is the same as that of an air damper. For example, air regulation means for regulating the amount of air introduced into a fireplace can be used.

The cyclone dust collection device of the present invention adopts a dust collection principle in which dust is centrifugally rotated downward and then collected, as in the case of a conventional cyclone dust collection device. In order to produce rotation force, air is supplied tangentially with respect to the cyclone to create air flow directed downward.

In other words, in the cyclone used in the present invention, the air, which is supplied tangentially to the upper end of the cyclone from the air conveyor box and contains fire particles and foreign substance, is rotated from top to bottom. At this time, fine particles and foreign substances are collected by centrifugal force, and the air from which the fine particles and foreign substances have been removed is discharged through a discharge path defined at the upper part of the cyclone. To this end, the cyclone has a cone-shaped configuration.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
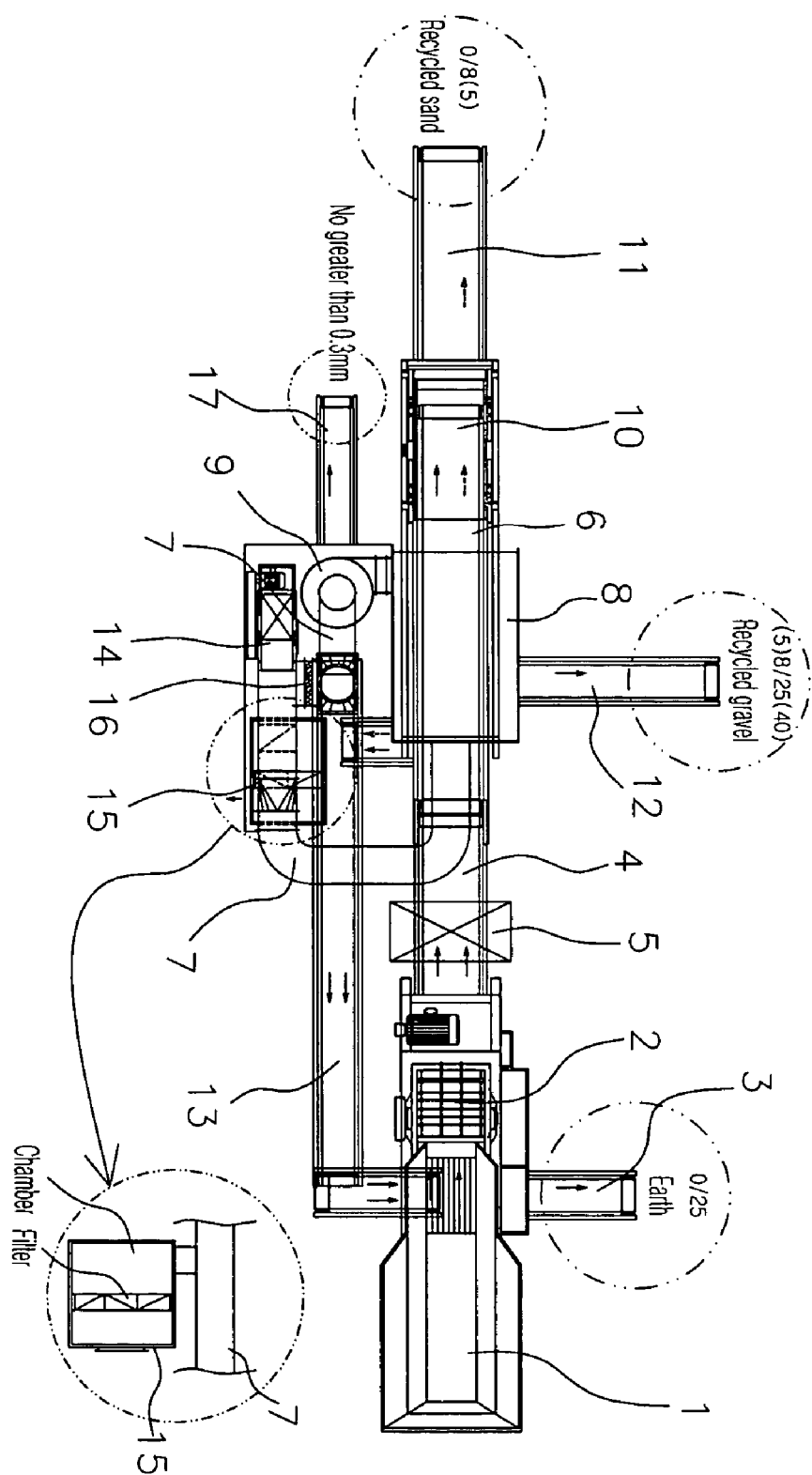
FIG. 1 is a schematic plan view illustrating the overall construction of an aggregate recycling apparatus in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
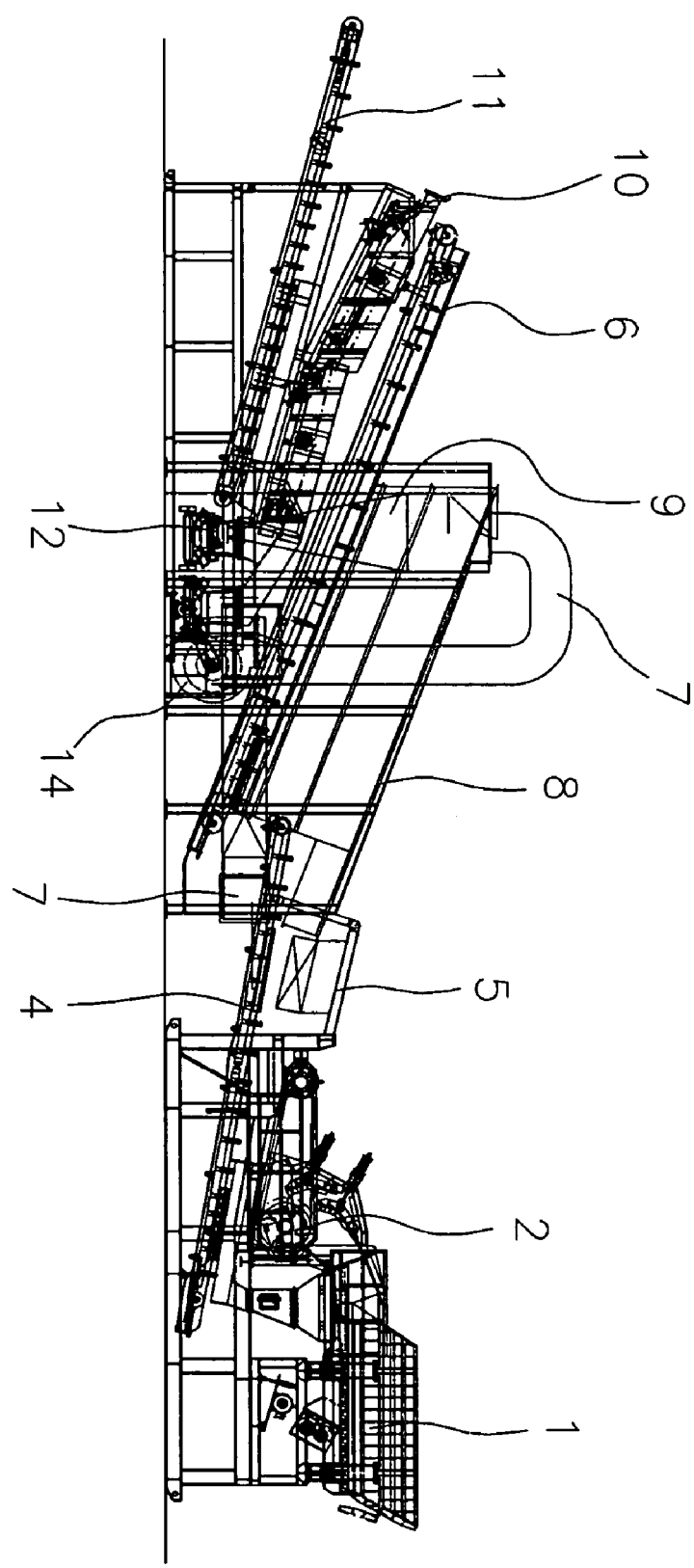
FIG. 2 is a schematic front view illustrating the aggregate recycling apparatus in accordance with the embodiment of the present invention.
Figure 3:
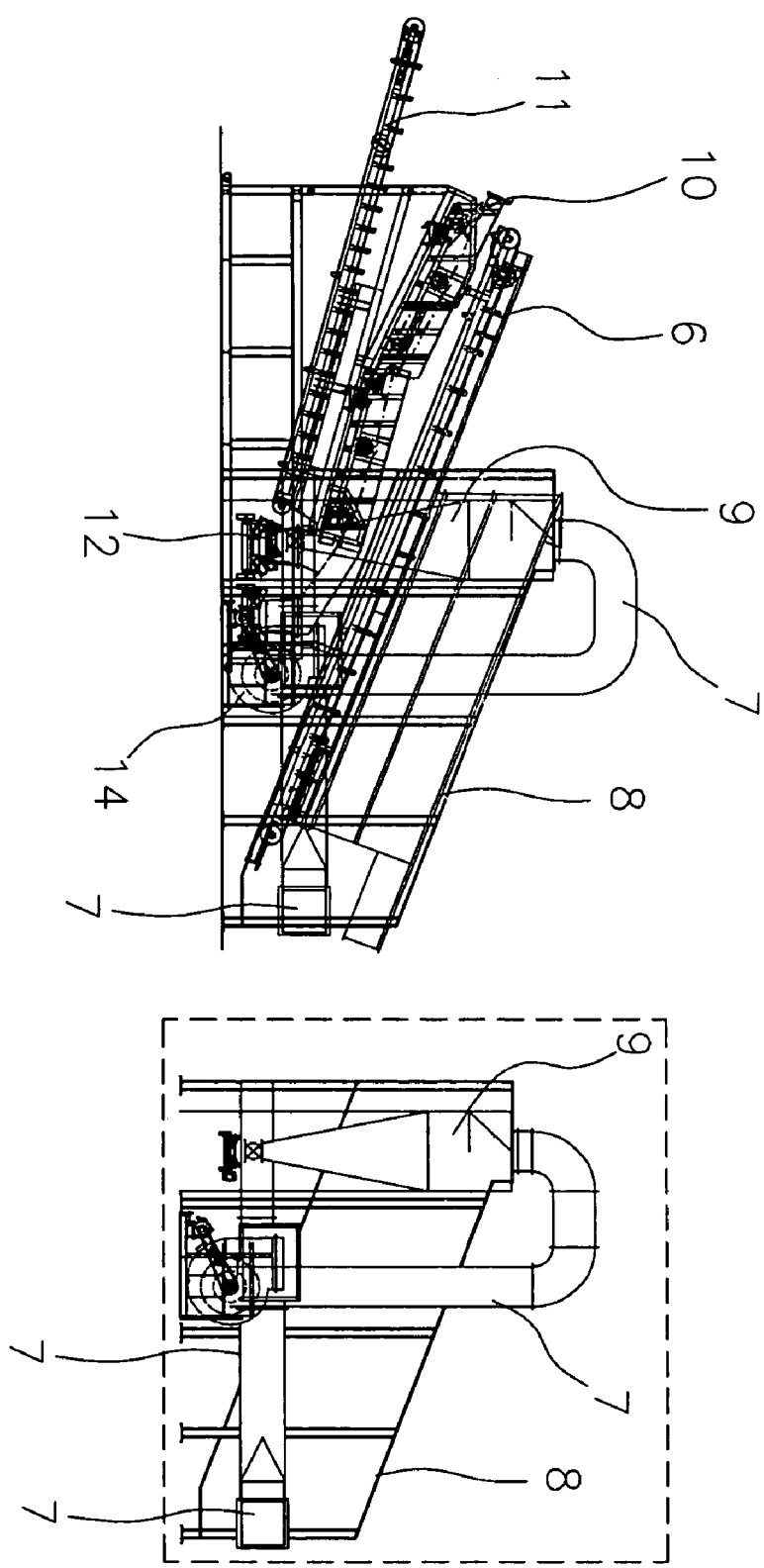
FIG. 3 is a front view illustrating an air circulation type foreign substance and fine particle separation device according to the present invention.
Figure 4:
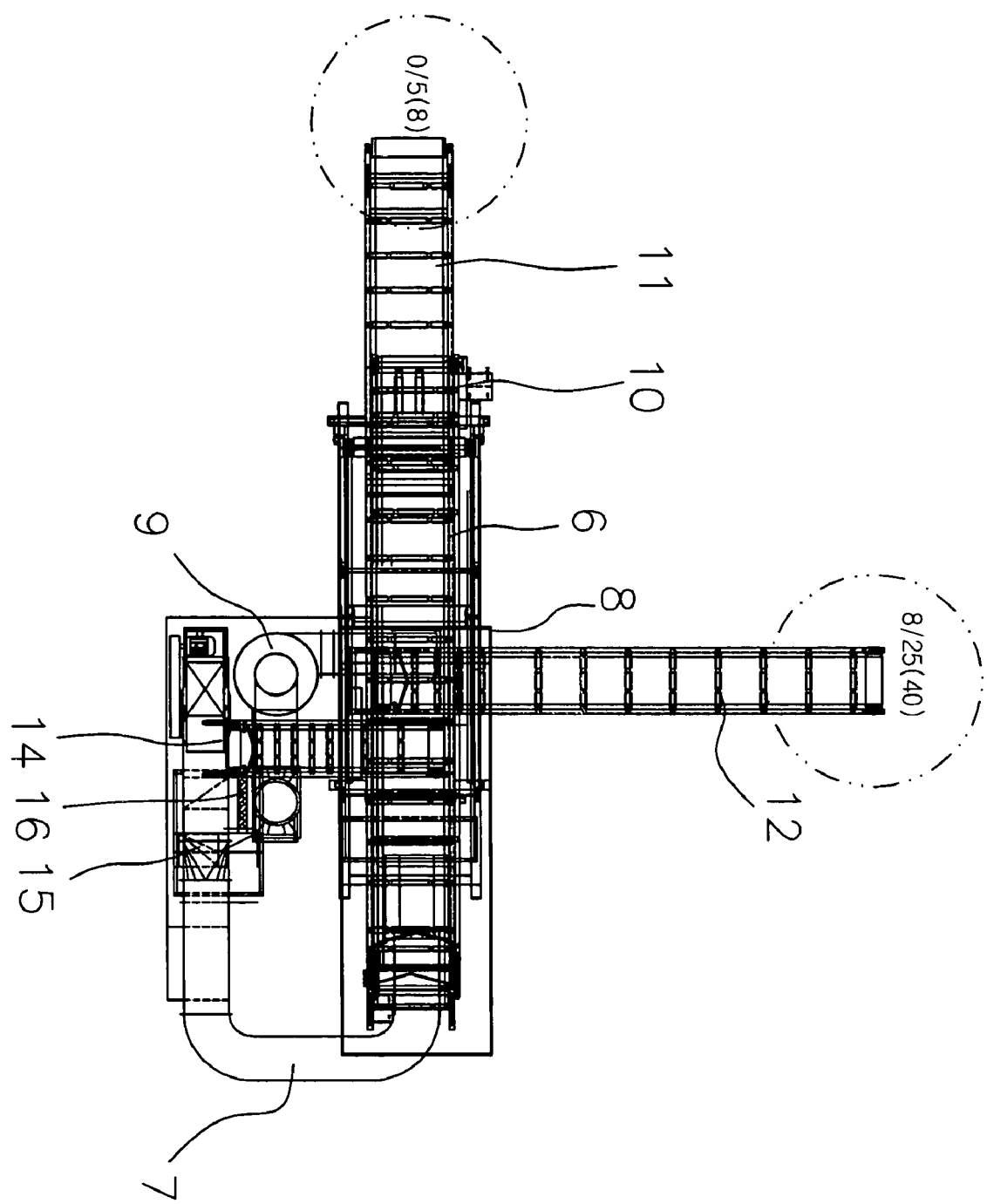
FIG. 4 is a plan view illustrating the air circulation type foreign substance and fine particle separation device according to the present invention.
Figure 5:
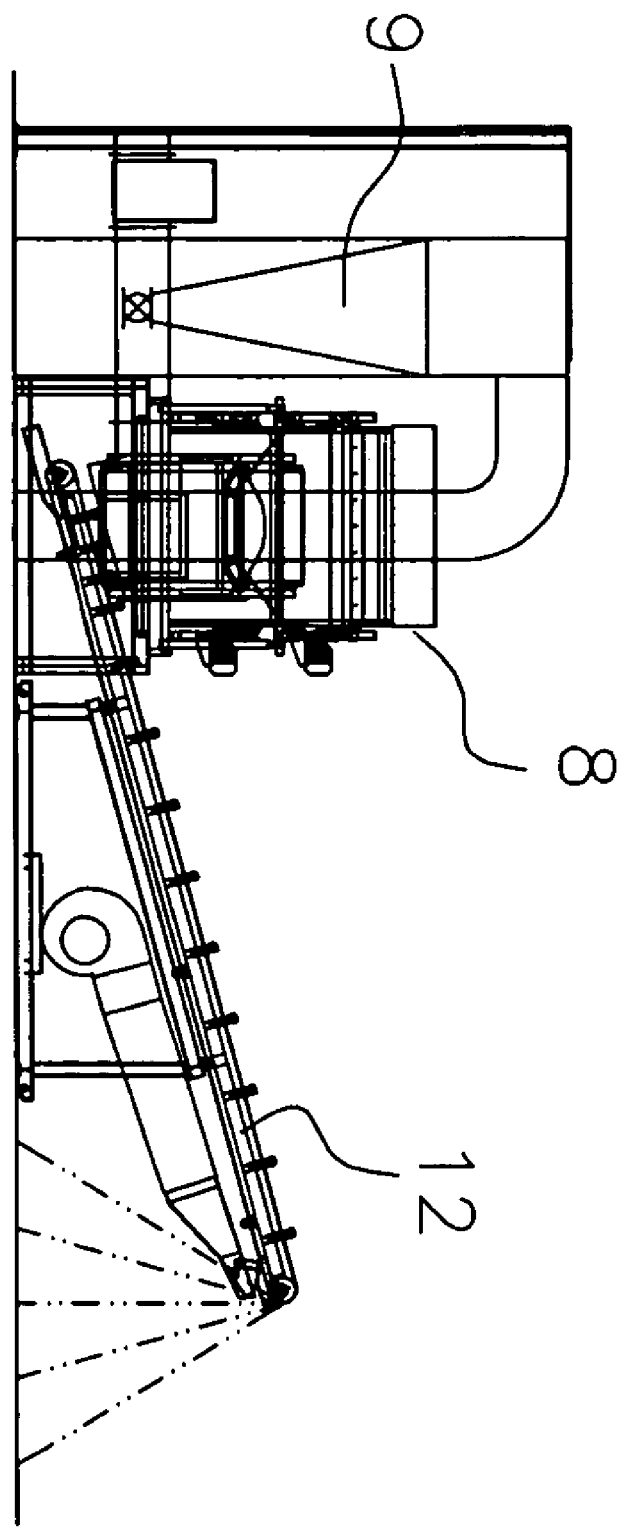
FIG. 5 is a side view illustrating the air circulation type foreign substance and fine particle separation device according to the present invention.

FIG. 1 is a schematic plan view illustrating the overall construction of an aggregate recycling apparatus in accordance with an embodiment of the present invention, FIG. 2 is a schematic front view illustrating the aggregate recycling apparatus in accordance with the embodiment of the present invention, FIG. 3 is a front view illustrating an air circulation type foreign substance and fine particle separation device according to the present invention, FIG. 4 is a plan view illustrating the air circulation type foreign substance and fine particle separation device according to the present invention, and FIG. 5 is a side view illustrating the air circulation type foreign substance and fine particle separation device according to the present invention. As shown in the drawings, in order to produce gravel from conventional construction waste, the present invention is constructed to include a crushing device such as an impact crusher, a conveying device such as a conveyor a blowing device such as a blower, and a screening device such as a double vibration screen. In the present invention, the conventional component elements are integrally coupled with one another to effectively accomplish the object of the present invention.

Concretely describing the integrated construction of the present invention, an integral type crushing device comprises a vibration hopper 1 which vibrates waste, screens the waste into earth and other waste at the right end on each of FIGS. 1 and 2, and discharges the earth onto a side conveyor 3, an impact crusher 2 which crushes the other waste excluding the earth to be no greater than a predetermined size, a discharge conveyor 4 which conveys crushed products, and a magnet 5 which separates metallic material above the discharge conveyor 4. That is to say, the waste crushed by the impact crusher 2 is conveyed on the discharge conveyor 4 which is installed downstream of the impact crusher 2 to convey the waste crushed by the impact crusher 2, and metallic material such as steel is separated by the magnet 5 which is installed above the discharge conveyor 4. Then, the crushed products deprived of the metallic material are discharged over the discharge conveyor 4.

At the downstream end of the discharge conveyor 4, the crushed products drop onto an air conveyor 6, which is installed below the downstream end of the discharge conveyor 4. In the path through which the crushed products drop at the downstream end of the discharge conveyor 4, a forced air flow passage 7 which constitutes an air circulation type fine particle and foreign substance separation device is defined to direct air toward the dropping crushed products. That is to say, by blasting air to be circulated through the forced air flow passage 7 defined below the discharge conveyor 4, the foreign substances and fine particles contained in the crushed products are scattered into an air conveyor box 8.

The foreign substances and fine particles scattered into the air conveyor box 8 are sucked into a cyclone 9 to be centrifugally collected.

The crushed products which drop while overcoming the suction force of the cyclone 9 are discharged through the air conveyor 6 to be screened according to their sizes on a double vibration screen 10.

In the double vibration screen 10, the crushed products are screened into three types of aggregate. The crushed products having a small size of 0.3~8 mm are discharged onto a lower conveyor 11 which is installed below the double vibration screen 10 to be used as recycled sand, and the crushed products having a medium size of 8~25 mm are discharged onto a side conveyor 12 which is disposed at one side of the double vibration screen 10 to be used as recycled gravel. Further, the crushed products having a large size of no less than 25 mm are put again into the impact crusher 2 through a return conveyor which is disposed at the other side of the double vibration conveyor 10 to be crushed again, or are put into a secondary crusher, such as a cone crusher or a vertical impact crusher.

While only the vibration hopper 1 and the impact crusher 2 are illustrated in the drawings, a jaw crusher, which serves as a primary crusher for crushing waste from which earth has been primarily removed in the vibration hopper after waste is put into the apparatus, and a double jaw crusher or a cone crusher may be further employed. Also, after passing through the secondary crushers, the crushed products can pass through a cone crusher or a vertical type impact crusher.

In FIG. 2, a part of the return conveyor 13, the side conveyor 3, the chamber and filter 15, the fan regulation plate 16, and a discharge conveyor 17 which are shown in FIG. 1 are omitted for the sake of convenience in illustration.

Describing, with reference to FIGS. 1 through 5, the configuration of the device for removing foreign substances and fine particles in the apparatus according to the present invention, the device largely comprises the air conveyor box 8 and the cyclone 9 for sucking foreign substances and fine particles from the air conveyor box 8.

In the course of directing air toward the crushed products in the crushing device, the foreign substances and fine particles are scattered in the air conveyor box 8. In order to prevent scattered dust from leaking outside, the side and upper walls of the air conveyor box 8 are closed. A portion of the cyclone 9 communicates with the upper end portion of the air conveyor box 8 to scatter such fine particles and foreign substances. While the connection point may be set at any location on the air conveyor box 8, it is preferred that it be set at a place having high dust collection efficiency.

The cyclone 9 is structured to suck fine particles and foreign substances which are scattered in the air conveyor box 8 by the suction force from the blower 14.

After the fine particles and foreign substances are sucked into the cyclone 9, the fine particles and foreign substances are rotated in the cyclone 9 by air supplied tangentially into the cyclone 9. At this time, due to the funnel-shaped configuration of the cyclone 9, the fine particles and foreign substances collect at the bottom of the cyclone 9 to be discharged onto the discharge conveyor 17.

The fine particles and foreign substances which are contained in the air sucked into the blower 14 and are not removed in the cyclone 9 are removed by the chamber and filter 15 which are installed in the middle of the forced air flow passage 7. As a result, the air is purified, and a predetermined amount of air is discharged. A fan regulation plate 16 is installed at the front end of the blower 14 to decrease air blasting pressure and regulate the amount of suction air. In this way, negative pressure is created in the air conveyor box 8 to avoid raising dust. The remaining air which is discharged outside is re-circulated by the blower 14 through the forced air flow passage 7 to be reused.

As is apparent from the above description, the aggregate recycling apparatus according to the present invention provides advantages as described below. Since foreign substances and fine particles are separated in an air circulation type fine particle and foreign substance separation device immediately after waste (including construction waste) is crushed, the amount of dust raised during the screening and separation of crushed products can be significantly decreased, and high quality recycled gravel can be produced. Therefore, problems, which are caused in the conventional art in association with large scale turbid water treatment facilities, namely, flocculants causing soil pollution, dust generation by dry type separation, the need for a water spraying device to prevent dust generation, difficulty using the dry type cyclone to remove fine particles when the water spraying device is used, etc., can be solved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An aggregate recycling apparatus including a crushing device for crushing waste, blowing means for blowing air toward crushed products, a conveying device for conveying the crushed products, and a screening device for screening the crushed products, the apparatus comprising:

the crushing device having a vibration hopper, an impact crusher, a discharge conveyor, and a magnet which are integrally coupled with one another, the vibration hopper receiving waste to be crushed to a predetermined size, separating earth from the waste, discharging the earth onto a side conveyor disposed below the vibration hopper, and supplying the waste to the impact crusher, the impact crusher receiving the waste from the vibration hopper and crushing the waste, the discharge conveyor being installed below the impact crusher and discharging crushed products, and the magnet being installed above the discharge conveyor and separating metallic material from the crushed products conveyed on the discharge conveyor;

an air circulation type fine particle and foreign substance separation device having a forced air flow passage, an air conveyor box, and a cyclone, the forced air flow passage being defined below an end of the discharge conveyor on which the crushed products, obtained from the impact crusher of the crushing device, are conveyed, directing air supplied from a blower toward the crushed products dropping from the end of the discharge conveyor so that the crushed products can be scattered in the air conveyor box depending upon specific gravities thereof, and partially communicating with the cyclone and the air conveyor box to re-circulate air using the blower, upper and side walls of the air conveyor box being closed, the forced air flow passage being defined at a portion of an upper part of the air conveyor box to communicate with the cyclone, the cyclone performing dry sucking and separating fine particles and foreign substances contained in the crushed products, which are scattered into the air conveyor box;

an air conveyor installed at a lower part of the air conveyor box to convey the crushed products which drop against suction force of the cyclone, on to a double vibration screen serving as the screening device; and the double vibration screen for receiving the crushed products from the air conveyor and screening the crushed products into three types of aggregate.

2. The apparatus according to claim 1, wherein a lower conveyor is disposed below the double vibration screen to allow aggregate having a small size of 0.3~0.8 mm to be used as recycled sand, a discharge conveyor is disposed at one side of the lower conveyor to allow aggregate having a medium size of 8~25 mm to be used as recycled gravel, and a return conveyor is disposed at the other side of the lower conveyor to allow aggregate having a large size of no less than 25 mm to be crushed again.

3. The apparatus according to claim 1, wherein the air circulation type fine particle and foreign substance separation device comprises a blower for blowing again air circulated after being rid of dust in the cyclone, and the forced air flow passage which is defined below one end of the discharge conveyor to scatter the crushed products dropping from the crushing device using air blown again from the blower.

4. The apparatus according to claim 3, wherein a chamber and a filter are installed between the blower and the forced air flow passage to remove fine particles which are not removed in the cyclone and to purify and discharge a predetermined amount of air so that negative pressure is created in the air conveyor box.

5. The apparatus according to claim 4, wherein a fan regulation plate is installed between the cyclone and the blower to regulate air suction force of the cyclone in response to an air blast amount.

6. The apparatus according to claim 1, wherein the cyclone is shaped to have a cone-shaped configuration so that air which is supplied tangentially to an upper end of the cyclone from the air conveyor box and contains fine particles and foreign substances, is rotated from top to bottom, the fine particles and foreign substances collected by centrifugal force, and the air, rid of the fine particles and foreign substances, is discharged through a discharge path defined at an upper part of the cyclone.

* * * * *